(12) United States Patent
Victor et al.

(10) Patent No.: US 7,672,115 B2
(45) Date of Patent: Mar. 2, 2010

(54) INVERTER

(75) Inventors: Matthias Victor, Niestetal (DE);
Andreas Donth, Edermünde (DE);
Johannes Häde, Alheim (DE); Joachim Laschinski, Kassel (DE); Alexander Benn, Stuttgart (DE)

(73) Assignee: SMA Technology AG, Niestetal (DE)

( * ) Notice: Subject to any disclaimer, the term of this patent is extended or adjusted under 35 U.S.C. 154(b) by 11 days.

(21) Appl. No.: 12/151,259

(22) Filed: May 5, 2008

(65) Prior Publication Data

US 2008/0291609 A1 Nov. 27, 2008

(30) Foreign Application Priority Data

May 23, 2007 (EP) .................................. 07010195

(51) Int. Cl.
*H05K 7/20* (2006.01)
*H01F 27/04* (2006.01)
(52) U.S. Cl. .................... 361/625; 361/616; 312/223.2; 174/50; 174/52.1; 363/141; 363/144
(58) Field of Classification Search ................. 361/103, 361/622–627, 632, 643–647, 658, 801, 807, 361/820; 363/40, 55, 58, 132, 141, 131, 363/144–147, 112, 149; 174/16 R, 50, 52.1, 174/52.4; 312/223.2, 223.3; D13/119, 123, D13/124, 162; 307/147, 150, 151; 318/778
See application file for complete search history.

(56) References Cited

U.S. PATENT DOCUMENTS

| | | | | | |
|---|---|---|---|---|---|
| 4,872,102 | A | * | 10/1989 | Getter | 363/141 |
| 5,091,823 | A | * | 2/1992 | Kanbara et al. | 361/697 |
| 5,892,872 | A | * | 4/1999 | Glover | 385/94 |
| 5,901,220 | A | * | 5/1999 | Garver et al. | 379/399.01 |
| 7,042,745 | B1 | * | 5/2006 | Chen | 363/144 |
| 7,295,440 | B2 | * | 11/2007 | Ganev et al. | 361/714 |
| 7,301,755 | B2 | * | 11/2007 | Rodriguez et al. | 361/676 |

FOREIGN PATENT DOCUMENTS

| | | | |
|---|---|---|---|
| DE | 2455689 A1 | | 5/1976 |
| EP | 0994559 A | | 4/2000 |
| EP | 1610452 A2 | * | 12/2005 |
| GB | 2212334 A | | 7/1989 |
| JP | 410224762 A | * | 8/1998 |

* cited by examiner

*Primary Examiner*—Michael V Datskovskiy
(74) *Attorney, Agent, or Firm*—Thomas R. Vigil

(57) ABSTRACT

The subject matter of the invention is an inverter including a casing (1), said casing (1) including at least two casing chambers (2, 3) that are each closable through a separate cover (2a, 3a).

8 Claims, 4 Drawing Sheets

INVERTER

FIELD OF THE INVENTION

The present invention relates to an inverter for a PV installation, including a casing.

In the utilization of alternative energy sources such as PV modules, inverters serve to convert direct current into alternating current. Such an inverter comprises a casing accommodating electronic power components. These electronic power components must be protected against environmental impacts, in particular against humidity. Such an inverter not only includes electronic power components but also at need a plurality of plugs or similar for connecting said inverter on the AC and on the DC side. Often enough, such an inverter also possesses a communication unit, for example in the form of a display that also has to be connected.

DESCRIPTION OF THE PRIOR ART

A converter is known from the document EP 0 994 559 A2, which is designed for indoor use only since the casing comprises, inter alia, openings through which water and dirt may penetrate. The converter possesses a casing with one chamber and a control head for placing thereon a connecting unit and a manual control unit.

An arrangement for concealing a fastening screw of the cover of a casing for electrical appliances is known from DE 24 55 689 A1. This flap, which serves to cover the screw, is retained by an additional screw so that the flap can only be removed if this additional screw is removed.

Inverters are installed by the electrician working on the site and mounting the PV installation. When known inverters are installed, the casing is opened for the electrician to accede the corresponding plug contacts. Since the mounting of such type inverters often occurs outdoors, the electronic power components are exposed to environmental impacts at least during mounting and installation.

It is known that the inverter casing accommodating the electronic power components must have a high IP-rating, namely the IP65 rating, in order to make certain that such an inverter is indeed protected against environmental impacts, in particular against humidity, when used outdoors. There is further the risk that the electrician damages intentionally or unintentionally parts of the power electronics when performing connecting operations on the inverter. When performing maintenance works on the PV installation, it is often enough the case that access must only be ensured to the discrete plug connections if e.g., PV modules need to be disconnected from the inverter or if a disconnection must occur on the AC side. This means that only the manufacturer or persons authorized by him are allowed to have access to the electronic power components for maintenance services.

BRIEF SUMMARY OF THE DESCRIPTION

This means that the object of the invention is to provide an inverter in which the electronic power components are not directly accessible for connecting operations only.

Accordingly, the solution proposed by the invention is that the casing includes at least two casing chambers, each one of them being closable by a separate cover, said cover having to be removed before the casing chamber can be opened. It appears therefrom that the electronic power components of the inverter may be housed in a separate casing chamber whilst the connecting plugs and the communication unit, in the form of a display for example, are housed in a second casing chamber that is disposed separately next to the first casing chamber in the inverter casing. Accordingly, it is not necessary to open the cover of the casing chamber accommodating the electronic power components for performing connecting operations. Advantageous features of the invention and particular embodiments thereof will become apparent from the dependent claims.

Referring to the arrangement of two chambers in the inverter casing, there is provided that the one first casing chamber accommodates the electronic power components, at least one electrical connection being provided to the first casing chamber from at least the second casing chamber, said electrical connection having an IP rating corresponding at least to that of the first casing chamber.

As already explained above, the electronic power components in the first casing chamber are connected on the AC side and on the DC side to the second casing chamber in which there are located the connecting elements. As also explained above, the chamber which accommodates the electronic power components must be protected against humidity in particular according to the IP65 rating. Accordingly, it must be ensured that the electrical connection between the first and the second casing chamber has at least the IP-rating of the first casing chamber, in the instant case for example at least the rating IP65.

Various variants may be envisaged to implement the AC side mains connection between the first and the second chamber through the wall that separates them. According to a variant, it is provided that the electrical connection includes a cable feedthrough. In this case, there is further provided that the first casing chamber, which comprises the electronic power components, possesses a terminal clamp for connecting the cable to the mains.

According to another variant of the invention, there is provided that the electrical connection includes a socket that is disposed in the wall to the first casing chamber, said socket serving to receive a plug with the power cord.

According to another variant, a lead-through terminal that is disposed in the wall to the first casing chamber is provided as the electrical connection. The implementation of such a lead-through terminal with the rating IP65 is also the subject matter of the invention. Accordingly, in order to ensure the tightness according to the rating IP65 referring to a lead-through terminal for example, there is provided that the lead-through terminal comprises a terminal body comprising a shield for abutting the wall of the first casing chamber, said terminal body comprising a clamping member through which the shield of the terminal body is pressed against the wall of the casing chamber. It is obvious therefrom that the shield of the terminal body is pulled against the wall by the clamping member during mounting so that the necessary tightness is ensured in the transition region between the one second chamber to the other first chamber. Advantageously, there is further provided that the shield comprises a peripheral seal by which the shield abuts the wall.

Referring to the clamping member, there is advantageously provided a clip that may be slidably received by the terminal body. Said clip is particularly configured like a U-shaped bar, the leg of said bar, when said bar is viewed from the side, flaring toward the bight segment of said bar. This means that the furthest the clip is pushed onto the terminal body, the more the terminal body is pulled against the wall together with the shield and the peripheral seal located thereon.

More specifically, for the bar to be slidably received by the terminal body, there is provided that the terminal body comprises rail-shaped seats for the legs of the bar, an abutment edge for the bar being respectively provided on the portion turned away from the shield on the rail-shaped seat, said abutment edge being configured to taper according to the configuration of the bar legs. Through this abutment edge, it is achieved that the bar, and also the clip, are pulled continuously against the wall located on the one side of the bar while they are moved to be placed onto the terminal body so that, as already explained, the shield is pressed against the wall. To secure the clip onto the terminal body, appropriate detent means are provided.

The invention will be described in closer detail herein after by way of example with reference to the drawings.

DETAILED DESCRIPTION OF THE INVENTION

Figure 1:
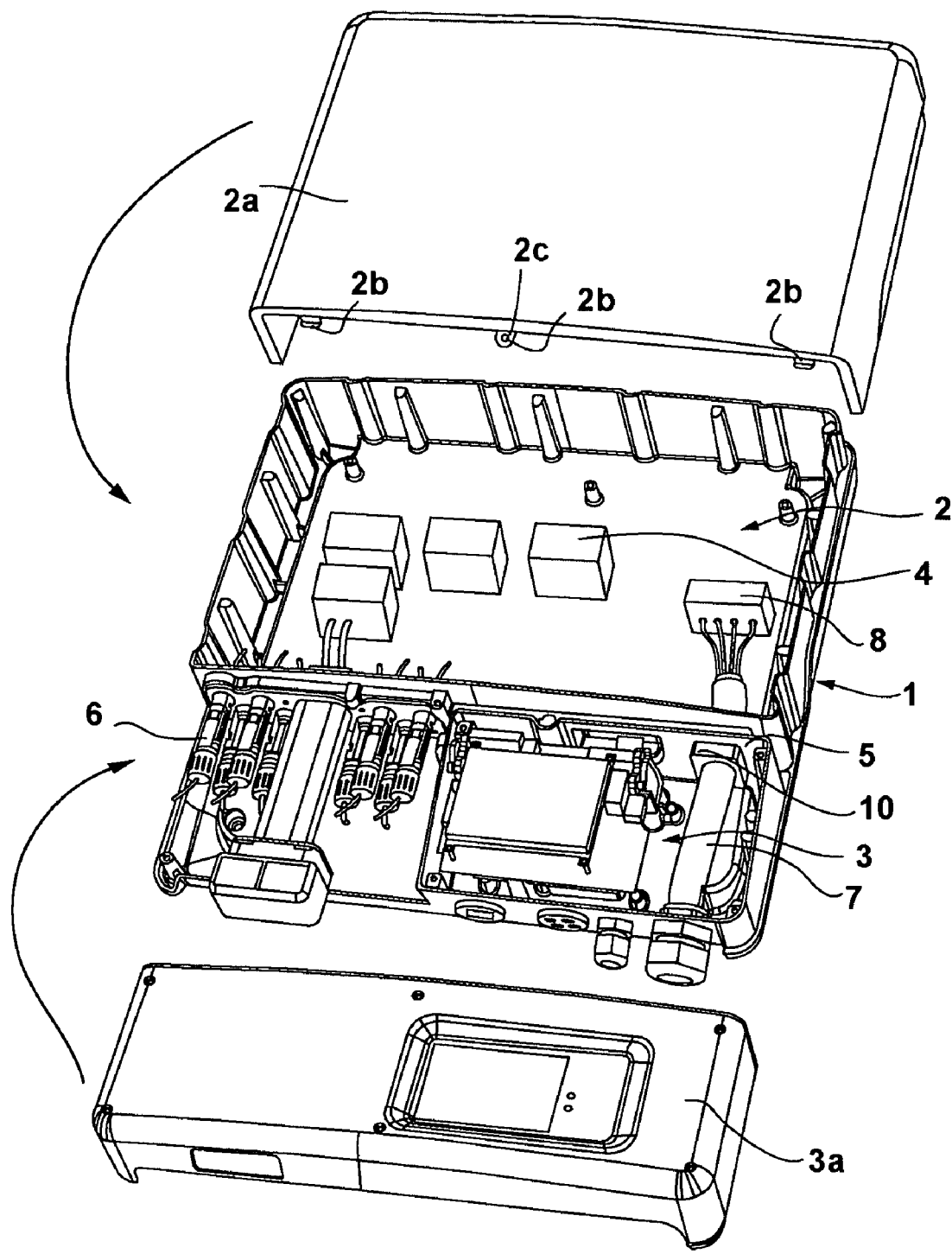
FIG. 1 schematically shows the inverter casing with the two removed covers for the two casing chambers.

The casing 1 of the inverter has the two chambers 2 and 3, the first chamber 2 showing the electronic power components 4 that are merely outlined in the first casing chamber 2. The two casing chambers 2 and 3 are separated by the wall 5. The wall 5 however comprises additional plug elements 6 for establishing on the DC side the connection with the PV modules to the electronic power components (not shown) in the chamber 2. On the AC side, there is provided a power cord 7 that is led through the wall 5 from the second casing chamber 3 into the first casing chamber 2. In said first casing chamber 2, there is located the mains connecting terminal 8 that receives the discrete strands of the cable 7. The cable feedthrough 10 through the wall 5 has the rating IP65 since the first casing chamber 2 is also protected against environmental impact, more specifically against humidity, according to this rating. This means that the cover 2a that covers the first casing chamber 2 comprises a seal so that the first casing chamber is to be assigned to the rating IP65 with respect to the protection against environmental impact. The second cover 3a covers the casing chamber 3, a peculiarity to be noted being that the cover 2a exhibits flaps 2b, one of them serving to receive a screw 2c that is screwed from the top into the front side of the wall 5, thus serving to fix the cover 2a to the first casing chamber 2. The important point is that the cover 3a covers the flaps 2b with the screw 2c so that the cover 3a must first be removed before the casing chamber 2 may be opened. This serves as an additional safety measure in order to prevent the electrician from also opening the first casing chamber out of mere thoughtlessness, even if it is not necessary.

As already explained above, the cable feedthrough 10 in FIG. 1 is to be rated IP65.

Figure 2:
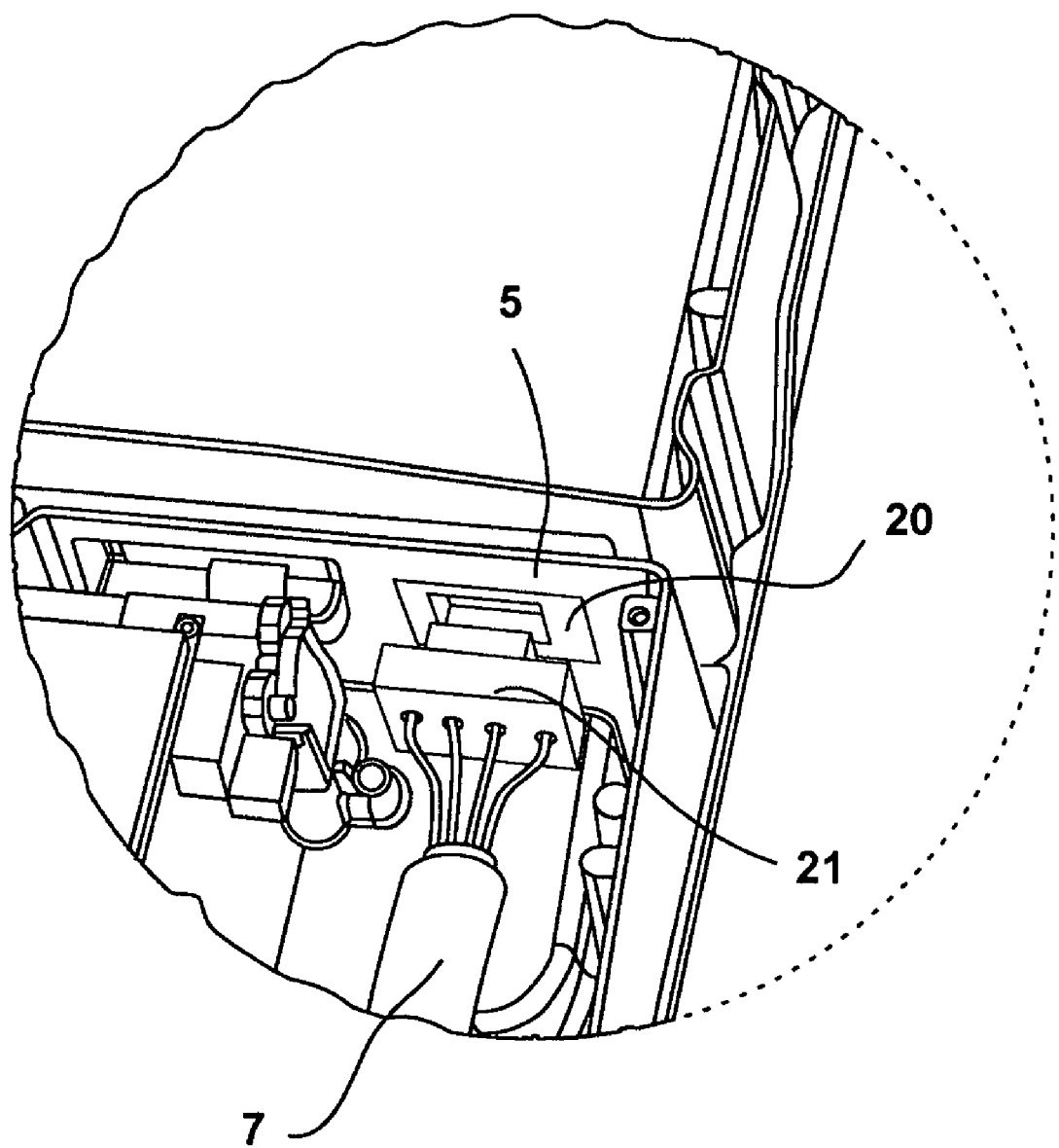
FIG. 2 shows a portion of the wall between the first and the second casing chamber, a socket for receiving a mains connecting plug being provided on the wall.

According to FIG. 2, a socket 20 is provided in the wall 5 as a variant of a connection of the power cord to the power electronics, said socket 20 also being rated IP65. The plug labelled at 21 of the power cord 7 is received by the socket 20.

Figure 3:
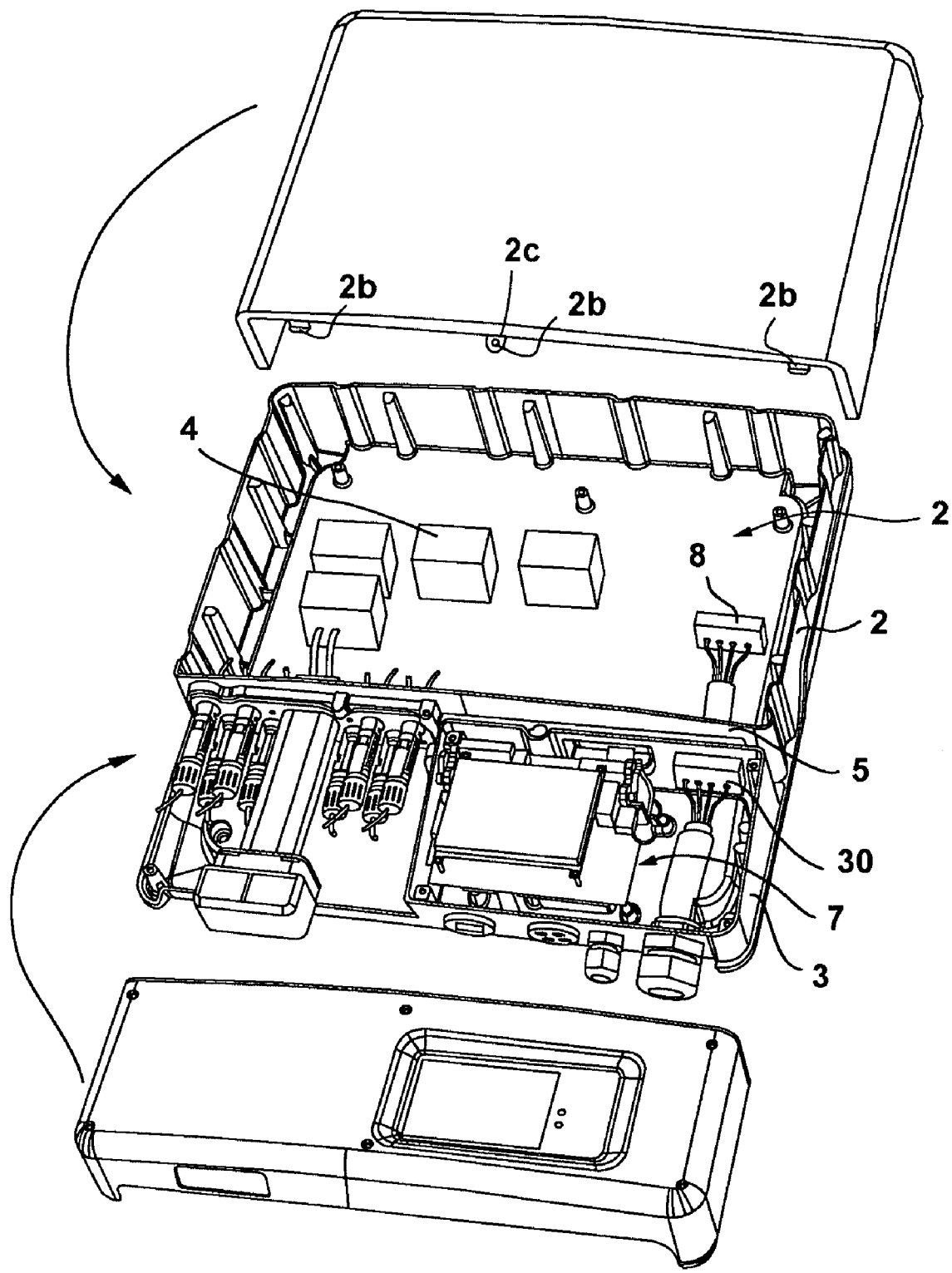
FIG. 3 shows an illustration like in FIG. 1, a lead-through terminal being provided in the wall and a mains connecting terminal being provided in the first casing chamber.
Figure 4:
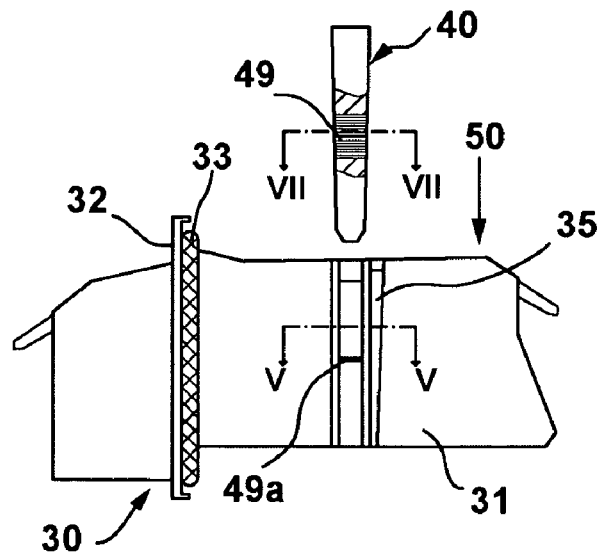
FIG. 4 shows the lead-through terminal shown in FIG. 3 in a side view.
Figure 5:
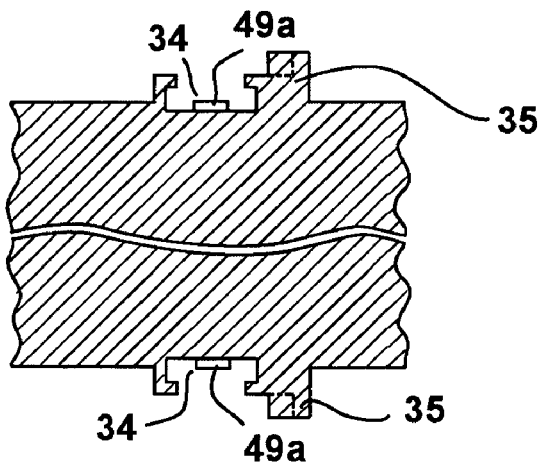
FIG. 5 shows a sectional view taken along the line V-V in FIG. 4 over the entire width of the lead-through terminal at a larger scale.
Figure 6:
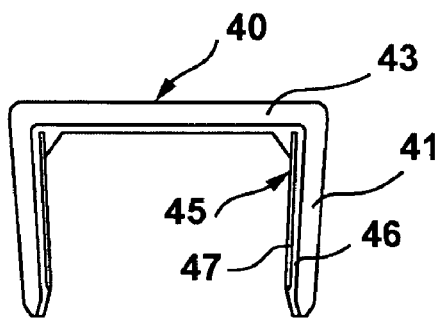
FIG. 6 shows a side view of the bar 40.
Figure 7:
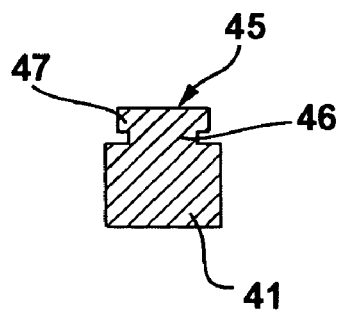
FIG. 7 shows the sectional view taken along the line VII-VII in FIG. 4 at a correspondingly enlarged scale like in FIG. 4.

Referring to FIG. 3, a lead-through terminal 30 is disposed in the wall 5 as another variant of a connection of the power cord to the power electronics, said lead-through terminal comprising on the one side, i.e., assigned to the casing chamber 3, connections for the power cord 7. In the casing chamber 2, there is located a mains connecting terminal 8 that is received by the discrete cable strands.

The FIGS. 4 through 7 are directed to the configuration of the lead-through terminal 30. The lead-through terminal labelled at 30 has the terminal body 31 as well as the shield 32 with the peripheral seal 33. The lead-through terminal 30 abuts with its shield the wall 5 between the two casing chambers 2 and 3. On either side, the terminal body 31 has rail-like seats 34 (FIG. 5) in the form of dovetail guides, an abutment edge 35 being provided in the region of the rail-like seat 34. The U-shaped bar labelled at 40 (FIG. 6), which consists of the two legs 41 and of the bight portion 43 connecting the legs, comprises on its leg 41 a T-shape configuration 45 with one guiding leg 46 and one guiding bight portion 47 extending transverse thereto and corresponding to the rail-like seat in the form of a dovetail guide 34 for the leg 41 of the bar 40 to be slidably received by the rail-like seat 34. Whilst the bar 40 is inserted by pushing it pursuant to the arrow 50 shown in FIG. 4, the bar 40 gets nearer to the shield 32 by virtue of the conical shape of the legs 41 (FIG. 4) and the abutment of the legs 41 on the abutment edge 35. It appears therefrom that, the more the bar 40 is pushed onto the terminal body, the more the shield 32 with the seal 33 is pressed against the wall 5, which has not been illustrated in FIG. 4. Detent elements 49, 49a in the form of detent noses that engage into each other in a snap-fit connection are provided between the leg 41 of the bar 40 and the terminal body to fix the bar 40 onto the terminal body 31.

We claim:

1. An inverter for a PV installation comprising:
   a first casing chamber and a second casing chamber, each separately closable by a corresponding first and second cover, the first and second covers being arranged such that the second cover has to be removed before the first cover can be removed;
   electronic power components being disposed in the first casing chamber; and
   an electrical connection being provided from the second casing chamber into the first casing chamber, the electrical connection having an IP rating at least corresponding to an IP rating of the first casing chamber,
   wherein the electrical connection comprises a socket disposed in a wall of the first casing chamber, the socket serving to receive a plug.

2. An inverter for a PV installation comprising:
   a first casing chamber and a second casing chamber, each separately closable by a corresponding first and second cover, the first and second covers being arranged such that the second cover has to be removed before the first cover can be removed;
   electronic power components being disposed in the first casing chamber; and
   an electrical connection being provided from the second casing chamber into the first casing chamber, the electrical connection having an IP rating at least corresponding to an IP rating of the first casing chamber,
   wherein the electrical connection comprises a lead-through terminal disposed in a wall of the first casing chamber.

3. The inverter as set forth in claim 2, wherein the lead-through terminal comprises a terminal body, said terminal body comprising a shield for abutment against the wall of the first casing chamber, said terminal body comprising a clamping member through which said shield of said terminal body is pressed against said wall.

4. The inverter as set forth in claim 3, wherein the clamping member is configured to be a dip that may be slidably received by the terminal body.

5. The inverter as set forth in claim 4, wherein the clip is configured like a U-shaped bar, the legs of said bar flaring toward the bight segment of said bar when said bar is viewed from the side.

6. The inverter as set forth in claim 5, wherein for the bar to be slidably received by the terminal body, said terminal body comprising rail-shaped seats for the legs of said bar, an abutment edge for said bar being respectively provided on the portion turned away from the shield on the rail-shaped seat, said abutment edge being configured to taper according to the configuration of the legs of said bar on the terminal body.

7. The inverter as set forth in claim 5, wherein the bar is adapted to be snap-fit to the terminal body.

8. The inverter as set forth in claim 3, wherein the shield comprises a seal on its side turned toward the wall.

\* \* \* \* \*